(12) United States Patent
Schreiber

(10) Patent No.: US 9,682,778 B2
(45) Date of Patent: Jun. 20, 2017

(54) METHOD AND SYSTEM FOR ASSIGNING INFORMATION CONTENTS

(75) Inventor: Gerald Schreiber, Wentorf (DE)

(73) Assignee: Siemens Convergence Creators GmbH (AT)

(*) Notice: Subject to any disclaimer, the term of this patent is extended or adjusted under 35 U.S.C. 154(b) by 105 days.

(21) Appl. No.: 14/423,160

(22) PCT Filed: Aug. 29, 2012

(86) PCT No.: PCT/EP2012/066756
§ 371 (c)(1),
(2), (4) Date: Feb. 23, 2015

(87) PCT Pub. No.: WO2014/032707
PCT Pub. Date: Mar. 6, 2014

(65) Prior Publication Data
US 2015/0244683 A1    Aug. 27, 2015

(51) Int. Cl.
*H04L 29/06* (2006.01)
*B64D 11/00* (2006.01)
(Continued)

(52) U.S. Cl.
CPC .... *B64D 11/00155* (2014.12); *B64D 11/0015* (2013.01); *G06F 21/10* (2013.01);
(Continued)

(58) Field of Classification Search
CPC .......... B64D 11/0015; B64D 11/00155; H04N 21/2146; H04N 21/26613;
(Continued)

(56) References Cited

U.S. PATENT DOCUMENTS

| 2005/0216938 A1 | 9/2005 | Brady, Jr. |
| 2013/0063612 A1* | 3/2013 | Royster ............. H04N 21/2146 348/207.99 |
| 2013/0318347 A1* | 11/2013 | Moffat .................... H04L 63/08 713/168 |

FOREIGN PATENT DOCUMENTS

| WO | 02067548 A1 | 8/2002 |
| WO | 2010058317 A1 | 5/2010 |

OTHER PUBLICATIONS

International Search Report for PCT Application No. PCT/EP2012/066756, mailed on Apr. 24, 2013.

* cited by examiner

*Primary Examiner* — Brandon Hoffman
*Assistant Examiner* — Nega Woldemariam
(74) *Attorney, Agent, or Firm* — Schmeiser Olsen & Watts LLP

(57) ABSTRACT

A method and system is provided, including an on-board server, by which, a link to the output unit is set up, and is assigned to a specific conveying means via a first key pair. A first secret key from the first key pair is stored on the on-board server. Before the use of the conveying means, an application is installed on the output unit and a second key pair is requested, a second secret key being transmitted to the application. Then, available information contents are displayed on the output unit, and a unique code is generated for each selected content. The selected contents are requested by the application and the unique code is assigned a third key pair. A third secret key is encrypted with the public keys and assigned to the on-board server. The selected contents, encrypted with a third public key, are then transmitted to the output unit.

17 Claims, 1 Drawing Sheet

(51) Int. Cl.
*H04N 21/214* (2011.01)
*H04L 29/08* (2006.01)
*G06F 21/10* (2013.01)
*H04N 21/266* (2011.01)
*H04N 21/6334* (2011.01)

(52) U.S. Cl.
CPC ........ *H04L 63/0428* (2013.01); *H04L 63/061* (2013.01); *H04L 67/12* (2013.01); *H04N 21/2146* (2013.01); *H04N 21/26613* (2013.01); *H04N 21/63345* (2013.01); *H04L 63/0442* (2013.01); *H04L 2463/062* (2013.01); *H04L 2463/101* (2013.01)

(58) Field of Classification Search
CPC .............. H04N 21/63345; G06F 21/10; H04L 63/0428; H04L 63/061; H04L 67/12; H04L 63/0442; H04L 2463/062; H04L 2463/101
See application file for complete search history.

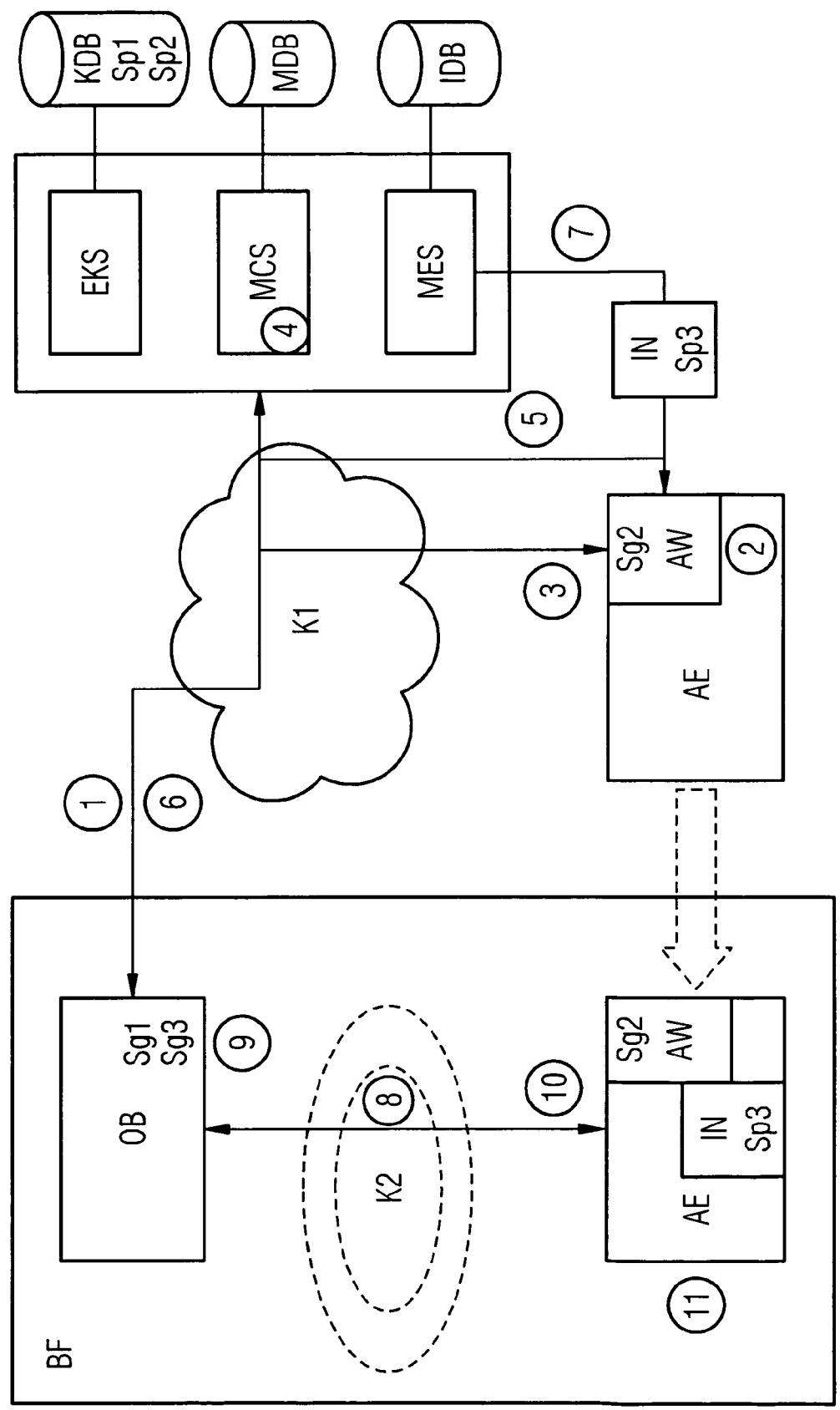

METHOD AND SYSTEM FOR ASSIGNING INFORMATION CONTENTS

CROSS-REFERENCE TO RELATED APPLICATIONS

This application claims priority to PCT Application No. PCT/EP2012/066756, having a filing date of Aug. 29, 2012, the entire contents of which are hereby incorporated by reference.

FIELD OF TECHNOLOGY

The following relates to a method for assigning information contents in a means of transportation, in particular an aircraft. The information contents are displayed in the means of transportation, during a journey for example, on a usually mobile user-specific output unit, such as e.g. smartphones, laptops, tablet PCs, etc. and are consumed by a user of the output unit. The following further relates to a system for carrying out the method for assigning information contents.

BACKGROUND

Means of transportation for people, such as aircraft, trains, buses or also ships for example, nowadays often accommodate information systems. From these information systems, which are also referred to as so-called infotainment systems, data can be transmitted to output units for information purposes and/or for entertainment for example. Via such information systems passengers, when they are using the respective means of transportation (e.g. aircraft, ship, train, etc.), are supplied with information offerings and/or entertainment programs for example. In such cases the output units for display and consumption of the information contents can be accommodated permanently in the means of transportation, such as e.g. output screens, or can be mobile user-specific output units (e.g. laptop, tablet PC, smartphone, etc.), which are either provided to a passenger or are taken by passengers themselves into the means of transportation.

The information systems—especially in aircraft—have undergone major development in the last 25 years. Initially these systems only consisted of audio systems, via which the passengers were offered audio information and/or audio data (e.g. music). As from the 1980s the information systems were expanded by streaming of video information (e.g. VHS video tapes etc.), wherein the information contents were to be viewed via group screens in the aircraft cabin for example. Since the early 1990s the information systems have been expanded into so-called in-seat video systems, in which for example video films, music or other information could be selected by a passenger, usually on a screen or output devices belonging to the seat, by means of a control device and were then displayed on the output device. Since then there have been approaches to providing passengers, especially in aircraft, with so-called infotainment—i.e. information contents such as e.g. real-time flight information, video data (e.g. news, films etc.), audio data, etc. for information and entertainment purposes—on mobile, user-specific output units (e.g. tablet PC, smartphone, laptop, etc.). The output units in such cases can be provided for example by the operator of the means of transportation or mobile devices of the passenger are used as the output device. In addition to aircraft, there are similar ideas for other means of transportation such as ships, trains, buses, etc. for example, for offering the passengers or travelers entertainment and/or information contents.

In aircraft information systems usually comprise a central server unit from which there is communication with the output units for example, inputs from passengers are processed and which looks after distribution of the information contents. In addition a database belonging to the information system is usually provided, in which for example information contents (e.g. video and/or audio data etc.) is stored, and if necessary other data (e.g. data from output units, etc.) can be stored. The selected information contents in such cases can be transmitted by means of so-called streaming to the user-specific output units, such as e.g. from mobile terminals brought with them by passengers (tablet PC, smartphone, etc.). However for such purposes, as well as an access point via which an output unit can set up a wireless connection to the information system of the means of transportation, a so-called streaming server for the transmission output of the information contents (e.g. audio and/or video data) is necessary. In addition, before any operation of the means of transportation, new up-to-date information contents must be loaded. This requires above all a high logistical effort and mostly an expensive and powerful infrastructure within the respective means of transportation (e.g. aircraft). Furthermore a comprehensive amount of data is needed for ongoing updating of the information contents, which must be transferred to the streaming server in such cases.

However, in order to supply passengers with up-to-date information contents, the option also exists for example of an operator of a means of transportation (e.g. airline, train operator, etc.) lending to the passengers free-of-charge or for a fee output units such as e.g. tablet PCs. Up-to-date information contents (e.g. video data, films, E-books, etc.) can then be loaded onto these output units. Information contents can then be selected by a passenger when they are using a means of transportation from the up-to-date information contents previously loaded onto the output terminals. Selected information contents can then be played back or displayed to the user on the output unit. The disadvantage of using output units with information contents loaded in advance onto the output unit however is that a high logistic outlay and also a corresponding number of output units are necessary. This is because the information contents have to be loaded very frequently onto the output units and updated during this process. The rechargeable batteries of the output devices must also generally be charged between two outputs. For updating the information contents in particular comprehensive amounts of data are also necessary, which must be available in a corresponding infrastructure for the loading of the output units.

A further option for using information contents within a means of transportation or during a journey with the latter consists for example of information contents (e.g. video data, E-books etc.) being purchased by a user or passenger. These information contents can then be loaded before a journey onto an output device belonging to the passenger (e.g. tablet PC, laptop, etc.). The passenger can take the output device with them into the means of transportation and can consume the previously purchased and loaded information content there. The disadvantage of this however is the high cost of obtaining a time-unlimited personal copy of the information contents. These costs are incurred by the passenger before use of the means of transportation and therefore at a point in time at which there is a far lower inclination for such expenditure than when using the means of transportation. A further disadvantage is the lack of availability of new, up-to-date information contents once the purchased or loaded contents have been used.

SUMMARY

Aspects of the invention specify a method and also a system, through which, without any great expense and also without any complex logistics and/or infrastructure and with high security, access to up-to-date information contents in a means of transportation, especially an aircraft, is made possible.

Further aspects of the invention include a method of the type mentioned at the start, in which each means of transportation—e.g. an aircraft, ship, etc. of an operator—is assigned an on-board server via a first key pair which consists of a first secret key and a first public key. The first secret key is stored in this case on the on-board server. Then, before the means of transportation is used, an application is installed on a mobile, user-specific output unit and a second key pair consisting of a second secret key and a second public key is requested by the application. The second secret key is then transmitted to the application on the output unit and thus e.g. the output unit or a passenger is uniquely identified. Available information contents are then displayed by the application. A unique identification is created for each selected information content, by means of which the selected information contents are requested by the application on the output unit. In such cases the unique identification is assigned a third key pair with a third secret key and a third public key. Then the third secret key is initially encrypted with the second public key which is assigned to the output unit or the passenger, and subsequently encrypted with the first public key, through which the corresponding on-board server is known and assigned to the corresponding on-board server of the server of the means of transportation or stored on the latter. The selected information contents are then encrypted with the third public key and transmitted to the output unit and stored there.

The main aspect of the solution proposed in accordance with embodiments of the invention consists of the encrypted information contents being transmitted at a separate time from the secret (third) key needed for decryption. The information contents is encrypted and transmitted to the user-specific output before the means of transportation is used. This enables strong and in some cases also computing-time-intensive encryption algorithms to be used for protecting the information contents. Furthermore the information contents are encrypted based on the unique identification which is allocated to selected information contents individually per user, wherein an identity of the user, on the basis of a booking for example—is especially known via the second key pair used. This enables theft of current, especially legally-protected information contents (e.g. films, E-books, etc.), to be proved very easily. For this reason and because of use of secure encryption algorithms the inventive method has a high level of security.

The secret key for decrypting the information contents is stored encrypted twice on the on-board server. Since the on-board server merely provides keys, no particular computing power is necessary for the on-board server and before the on-board server is used during operation of the means of transportation, only the correspondingly required keys have to be loaded—i.e. the keys which are necessary for decrypting information contents which have been selected by passengers. This means that both the infrastructure outlay or hardware outlay for the on-board server and also a logistics outlay is very small. Thus for example a mobile radio connection can be used for loading the keys as a result of the bandwidth and amount of data needed for it. A transmission of the extensive information contents is already undertaken before the use of the means of transportation e.g. by the passenger on the output unit, wherein communication networks with low costs and corresponding transmission rate can be used (e.g. Internet, etc.). This enables passengers to be provided with significantly more up-to-date and comprehensive offerings of information contents than with the use of a streaming server on board the means of transportation for example.

In the use of the means of transportation a connection to the on-board server is then set up ideally from the user-specific output unit. Before the playback of the selected information contents the third secret key, which is stored on the on-board server, is decrypted with the first secret key located on the on-board server. Then the third secret key still encrypted with the second public key is transmitted from the on-board server to the application on the output unit and is decrypted there with the second secret key. Then the selected information content located on the output unit can be decrypted with the third secret key and displayed. By only transmitting the third secret key necessary for decryption of the selected information contents during the use of the means of transportation, illegal use of the information contents is prevented very simply. The first and second key pair insure that the third secret key, which is assigned via the third key pair to the unique identification of the selected information contents, is available on the corresponding on-board server of each means of transportation in which the passenger able to be identified by the second key pair or the associated output unit with the encrypted information contents is also located. The information contents can be consumed during the use of the means of transportation and illegal use or theft of the information contents is prevented in a simple manner and at no great expense.

It is advantageous for an assignment between the on-board server, the user-specific output unit, selected information contents and/or the first, second and third key pair to be stored in an inventory database. A storage of this assignment in the inventory database enables an operator of the means of transportation to verify in a simple manner the means of transportation and the passenger in which or by which information contents have been or will be used. This enables theft and/or illegal usage (e.g. illegal copying, etc.) to be proved very simply and at no great expense.

It is also useful if, after installation of the application and a transmission of the second secret key to the application, a data record with information about use of the means of transportation is transmitted to the output unit or a passenger for example. In such cases the operator of the means of transportation (e.g. airline operator) can communicate to a passenger in the data record a description about their journey with the means of transportation or a unique description thereof. This data record can for example be transferred by means of an e-mail which is encrypted and/or signed if necessary, an SMS e.g. sent to a telephone number known to an operator or stored during a booking or e.g. for a flight via a boarding pass. The data record can e.g. be accepted automatically by the application on the user-specific output unit or it can be very easily actively checked by the application after its installation or after it has been started, using this data record, whether the user of the output unit is booked as a passenger for a specific use of a means of transportation (e.g. flight, train journey, etc.).

A preferred further development of the inventive method makes provision for the key pairs to be created by a key server. Furthermore it is advantageous for the public key, especially the first and second public key of the first and second key pair, to be stored in a key database. This enables the key pairs and also the keys to be created centrally in a simple manner. Also the public keys, especially those public keys that are used for encrypting the third secret key, can be buffered or stored centrally. Through this an infrastructure or logistics outlay is reduced in a very simple manner.

An expedient embodiment of the inventive method makes provision for the secret keys as well as all selected information contents to be deleted from the output unit on exit from the means of transportation. By deleting the selected information contents illegal use is prevented in a simple manner and the security or the protection is increased for the information contents. By the on-board server or the key server deleting the secret keys, use and/or access to the encrypted information contents after exit from the means of transportation after ending a journey is additionally prevented. As an alternative for example the secret keys can already be deleted from the key server after a confirmed transmission—for the first secret key and the third secret key to the on-board server and for the second secret key to the application on the user-specific output unit. If necessary the selected information contents and the secret keys can be deleted after a time delay, in order to take account of late arrivals or delays in the time for which the means of transportation is used.

It is advantageous if the unique identification is issued by a catalog server for each selected information content. The catalog server enables the available information contents to be managed centrally in a simple manner and displayed to the application on the user-specific output unit. Issuing the identification separately for a selected information content then enables said content to be uniquely assigned to a specific usage of a means of transportation (e.g. flight, train journey, etc.) and also to a passenger.

In a preferred development of the inventive method the third key pair is generated at the time at which an information content is selected. This means that key pairs for encryption of information contents are only created on demand and the number of these key pairs is kept small. The key pair can then be assigned very simply and uniquely to the selected information content or to the associated unique identification.

As an alternative however it can also be advantageous for a number of third key pairs to be created in advance to form a reserve quantity and then be transmitted to the on-board server. In such cases, at the time at which an information content is selected, a third key pair is taken from the reserve and this third key pair is then assigned the unique identification of the selected information contents. The advantage of this method of operation is that information contents can be selected even very shortly before the use of the means of transportation, for example after a transmission of the keys to the on-board server. The third secret key (for decrypting the selected information contents) is simply transmitted in such cases encrypted in advance with the first public key which is assigned to the on-board server. The forwarding of the third secret key to the output unit is then carried out by the on-board server during the use of the means of transportation, for example via a secured method, e.g. by means of the second public key or by means of Secure Socket Layer (SSL).

Ideally, selected information contents are marked during encryption. Such marking can be undertaken so as to be readily visible, through so-called watermarking, audible or concealed by so-called forensic watermarking in the picture, video and/or sound signal. Forensic watermarking is a technical marking in the carrier media such as e.g. image, video or audio data or texts which is related to the work and mostly not perceptible. A forensic watermark is therefore used for example to embed rights owner information for proprietary rights violation tracking in a work. Therefore with forensic watermarking the authenticity of a file can be verified very easily and is traceability insured.

The object is also achieved by a system of the type mentioned at the start, in which an on-board server for setting up a connection with a user-specific output such as a tablet PC smartphone, laptop, etc. for example within a means of transportation, an application which is able to be installed on the output unit, a key server and a key database for creating and storing key pairs—consisting of a secret key and a public key—as well as the key and a catalog server for requesting an offering of available information contents and for issuing unique identifications for selected information contents are provided. Furthermore the inventive system comprises an encryption server for encrypting selected information contents, an inventory database for storing assignments between the on-board server, user-specific output unit, selected information contents and/or associated key pairs in each case as well as an information database for storing available and selectable information contents. Furthermore a least one communication network is provided for communication inside and communication outside the means of transportation in each case.

The main aspect of the inventive system consists of a separation being made between a communication of the selected, encrypted information contents and a communication of the corresponding keys for decryption. By setting up the system in an on-board server on which only the corresponding keys—a first secret key, which identifies the on-board server, and a third secret key for decrypting the information contents—are stored, an application, which is able to be installed on a user-specific output unit and looks after communication with the other system components, and central server and database units for key generation and storage, management of the information contents, etc. in particular the infrastructure or hardware for a use of information contents during the use of a means of transportation is kept simple and low-cost. Furthermore through the inventive system selected information contents can be securely encrypted and uniquely assigned to a specific use of a means of transportation (e.g. flight, etc.) and assigned to a specific passenger, through which theft and/or misuse of the information contents is rendered more difficult or prevented. In addition for a system outside the means of transportation the option exists of making available a significantly larger offering of information contents than with a streaming server or system within the means of transportation, since a system with a significantly larger storage capacity can be used outside the means of transportation.

It is therefore advantageous for the key server, the catalog server and the encryption server to be grouped together on one server and/or the key database, the inventory database and the information database in which the available and selectable information contents is stored to be grouped together in one database. In this way costs for infrastructure or hardware can be very easily reduced.

Ideally the on-board server is embodied as a mobile unit. In this case it is conceivable for the on-board server to be embodied as a mobile device operated by rechargeable batteries, which is only activated when it is employed in a means of transportation—i.e. during a flight or a train journey, etc. In such cases advantageously no technical flight approval is needed for use in aircraft or no technical rail approval for use in a train, since the on-board server is not connected to the means of transportation. In addition for example the on-board server—in accordance with the assignment by the first key pair—can be used flexibly in different means of transportation of the operator.

However it is also possible for the one-board server to be embodied as a software module. The on-board server is thus very easily able to be used with existing installations which have only very little memory and/or processing resources (e.g. processor unit, etc.) such as e.g. so-called connectivity systems, local Web servers, etc.

As an alternative the option also exists of the on-board server not being accommodated on board the means of transportation but being installed outside in the remaining server and database components of the system. A communication with the output units when using the means of transportation (e.g. flight, train journey, etc.) then takes place via the so-called connectivity system for example or for example the third secret key for decrypting the selected information contents is communicated immediately before the means of communication is used—e.g. immediately before departure for example, at check-in or during boarding. In such cases global positioning of the output unit can be carried out in order to establish whether said unit is located in the vicinity of the means of transportation (e.g. gate for aircraft, etc.). Through this the infrastructure in the means of transportation is kept small and this is additionally insured, that the information content is not used by unauthorized persons.

BRIEF DESCRIPTION

Some of the embodiments will be described in detail, with reference to the following FIGURES, wherein like designations denote like members, wherein:

FIG. 1 depicts a schematic view of an embodiment of a system for assigning information contents that can be displayed and consumed on a user-specific output unit.

DETAILED DESCRIPTION

FIG. 1 shows in a schematic and exemplary manner the inventive system for assigning information contents IN, which during the use of a means of transportation BF, such as e.g. an aircraft, but also a train, a ship or a bus, can be displayed and consumed on a user-specific output unit AE (e.g. tablet PC, smartphone, laptop, etc.). In such cases the system comprises a number of ideally centrally embodied components. These components are at least a key server EKS, a catalog server MCS and an encryption server MES, which can either be embodied as a separate server or can be grouped together on a common server. Also provided as components are at least one key database KDB, an information database MDB and also an inventory database IDB, which is likewise embodied as a separate database or can be grouped together in a database.

The key server EKS and also the key database KDB are used for creating and storing key pairs (Sg1, Sp1, Sg2, Sp2, Sg3, Sp3), which each consist of a secret key (Sg1, Sg2, Sg3) and a public key (Sp1, Sp2, Sp3). Stored in the information database MDB are up-to-date information contents IN available to users of the means of transportation BF. An offering of the available information contents IN can be requested via the catalog server MCS, from which also unique identifications for the information contents IN then selected in each case are issued. Selected information contents are encrypted by the encryption server MES and in the inventory database IDB assignments created by the inventive method are stored, such as the assignment of unique identification of selected information contents IN to a means of transportation BF for example and to a user of the means of transportation BF.

Furthermore the inventive system comprises an on-board server OB, which is accommodated within the means of transportation BF and from which a connection to the user-specific output unit AE is set up via a communication network K2. The on-board server can be embodied for example as a mobile, battery-operated device, which is placed on board the means of transportation BF and is activated during operation of the means of transportation BF (e.g. flight, train journey, etc.). As an alternative the on-board server can for example also be embodied as a software module, which is installed for example on an installation already existing in the means of transportation BF or an infrastructure, such as a local Web server for example or a so-called connectivity system. In addition it is also possible for the on-board server OB to be installed outside the means of transportation BF—for example at the other system components—and e.g. to transfer data (such as e.g. a key Sg3, etc.) to the user-specific output unit AE over a general communication network (e.g. mobile radio network) shortly before the means of transportation BF is used.

In the inventive system an application AW is also provided which is able to be installed on a user-specific output unit AE or is installed during an execution of the inventive method on the user-specific output unit AE. The application AW can for example be loaded onto their output unit AE (e.g. tablet PC, smartphone, laptop etc.) by the user or passenger before they use the means of transportation BF on the recommendation of an operator of the means of transportation BF (e.g. airline, etc.).

Furthermore the inventive system includes at least one communication network K1, K2 in each case for a respective communication outside and inside the means of transportation BF. The Internet or a radio network (e.g. wireless LAN, UMTS, etc.) can be used as the communication network K1 outside the means of transportation BF, via which e.g. communication is set up between the output unit AE and/or the application AW and the system components such as e.g. catalog server MCS, key server EKS, encryption server MES. Communication between the on-board server OB and e.g. the key server EKS is likewise carried out by the communication network K1 outside the means of transportation BF. In this case for example keys Sg1, Sg3 can be transmitted to the on-board server OB before operation of the means of transportation.

For communication within the means of transportation BF—for example between the on-board server OB and the output units AE located in the means of transportation BF—a communication network K2 is used within the means of transportation BF. As a communication network K2 within the means of transportation BF a radio network such as e.g. Wireless LAN, GSM, UMTS or Next Generation Mobile Networks (abbreviated to NGMN) is able to be used.

Starting of the inventive method, which is carried out by means of the inventive system shown schematically and by way of example in FIG. 1, is performed in a first method step 1, in which via a first key pair Sg1, Sp1, which consists of a first secret key Sg1 and a first public key Sp1, the on-board server OB is assigned to a means of transportation BF (e.g. aircraft, etc.) of the operator of the means of transportation BF (e.g. airline, etc.). The on-board server OB will usually be located in the means of transportation BF—either as a separate mobile device or as a software module which is installed on an infrastructure located in the means of transportation BF. As described above, there is also the option for the on-board server OB to be installed or fitted outside the means of transportation BF. Information as to which on-board server OB corresponds to which means of transportation BF (e.g. aircraft, etc.), can be stored for example in the inventory database IDB. An assignment of means of transportation BF to specific routes (e.g. flights, rail routes, etc.) can e.g. be stored in a system of the operator of the means of transportation BF. Therefore, in the first method step 1, a first key pair Sg1, Sp1 is generated for each on-board server OB of the operator. In this case the respective first secret key Sg1 is sent to the respective on-board server OB and the respective public key Sp1 is stored by the key server EKS in the key database KDB. It is thus known in the system of the operator of the means of transportation which on-board server OB belongs to which means of transportation BF and to which route (e.g. flight, etc.).

In a second method step 2 an application AW is installed on the user-specific output unit AE of the passenger by the respective passenger/user of the means of transportation BF at the recommendation of the operator before the means of transportation is used. In a third method step 3 a second key pair Sg2, Sp2 is then requested by the application AW from the key server EKS. The second key pair Sg2, Sp2 likewise consists of a second secret key Sg2 and a second public key Sp2. The second secret key Sg2 in this case is transmitted in the third method step 3 via the communication network K1 to the output unit AE or to the application AW installed there and stored. The second public key Sp2 is likewise stored by the key server EKS in the key database KDB. The second key pair is thus uniquely assigned to the passenger or to their output unit AE, wherein the identity of the passenger is known to the operator of the means of transportation BF.

An information data record can now be transferred by the operator of the means of transportation BF to the passenger or the use of the means of transportation BF, by which the use of the means of transportation by the passenger (e.g. flight, railway journey, etc.) is uniquely described. This can be done for example by electronic mail (encrypted and/or signed if necessary), as an SMS or e.g. for a flight via the boarding pass. The information data record can for example be accepted automatically by the application AW or the application AW can for example check via the information data record when it is started whether a use of a means of transportation BF at the operator is booked for the passenger or the user of the output unit AE.

In a fourth method step 4 available information contents IN are then displayed by the application AW. An offering of available information contents IN, which are stored in the information database MDB, is made available to the application AW by the catalog server MCS via the communication network K1 (e.g. Internet, etc.). One or more information contents IN can then be selected by the application AW, which the passenger wishes to consume during an impending use of the means of transportation BF. For each selected information content IN a unique identification is created and issued by the catalog server MCS. Assigned to this unique identification in this case in the fourth method step 4 is the passenger or their output unit AE, the respective use of the means of transportation BF (e.g. flight, etc.) and the selected information content IN. In the fourth method step 4 billing data should expediently be acquired (e.g. bank account, credit card data, etc.). Optionally the selected information contents IN can already be paid for in the fourth method step 4, should the operator wish to charge for the service.

In a fifth method step 5 the application AW then requests the respective selected information content IN by specifying the unique identification of the encryption server MES. In this case the unique identification of the respective selected information content IN is assigned a third key pair Sg3, Sp3 generated by the key server EKS. The third key pair Sg3, Sp3 likewise consists of a third secret key Sg3 and a third public key Sp3. The third public key Sp3 is made available for an encryption of the selected information content IN to the encryption server MES.

The third secret key Sg3 is encrypted in a sixth method step 6 by the key server EKS initially with the second public key Sp2 and then with the first public key Sp1 from the key database KDB. Then the twice-encrypted third secret key Sg3 is assigned to the on-board server OB of that means of transportation BF which will be used by the passenger or by the user of the output unit AE. A clear storage of third secret key Sg3 should be avoided for security reasons. As a result of the sixth method step 6 an assignment of the unique identification of a selected information content IN, of on-board server OB, of passenger or of the output unit AE of the passenger, of selected information content as well as of first, second and third key pair Sg1, Sp1, Sg2, Sp2, Sg3, Sp3 is available. This result or this assignment can be stored in the inventory database IDB. The third secret key Sg3 is then transmitted shortly before operation of the means of transportation BF (e.g. before flight departure, before departure, overnight, etc.) with further twice-encrypted keys Sg3 for decryption of information contents IN to the on-board server OB of the means of transportation BF, so that these keys Sg3 are available during the use of the means of transportation BF.

In a seventh method step 7 the selected information content IN is then requested by the encryption server MES from the information database MDB and is encrypted with the third public key Sp3. Then the encrypted information content is transmitted via the communication network K1 outside the means of transportation BF to the output unit AE. A transmission can be performed in such cases e.g. without interaction of the user or of the passenger in the background. Depending on a time at which the information contents were selected, the transmission of the selected information contents can be undertaken for example with a low bandwidth and correspondingly longer loading time or can be restricted to times in which the output unit AE is unused or in which a free or low-cost data transmission is possible. It is also possible for selected information contents IN to be marked during the encryption process individually—for example with digital watermarks (e.g. picture, sound and/or video signal) in order to better recognize misuse.

During the use of the means of transportation BF the output unit AE, on which the application AW is installed and the selected, encrypted information content IN is stored, is taken by the passenger on board the means of transportation BF. On board the means of transportation BF, the output unit AE, in an eighth method step 8, sets up a connection to the on-board server OB via the communication network K2 within the means of transportation BF. This connection can be made for example via Wireless LAN with the known Service Set Identifier (SSID) and a previously exchanged network key, wherein the network key can be stored in the application AW.

The information contents IN previously selected and stored encrypted on the output unit are now offered by the application AW. If an information content IN is selected for playback, then in a ninth method step 9 the third secret key Sg3 necessary for decrypting the selected information contents IN is requested by the on-board server OB. The twice-encrypted third secret key Sg3 is decrypted by the on-board server OB with the first secret key Sg1 which is stored on the on-board server OB, and then simply transmitted encrypted with the second public key Sp2 in a tenth method step 10 to the application AW on the output unit AE. In an eleventh method step 11 the third secret key Sg3 is then decrypted with the second secret key Sg2, which is available on the output unit AE or for the application AW. Then the selected information content IN can be decrypted on the output unit AE with the third secret key Sg3 and displayed. In the eleventh method step 11, provided the operator wishes to charge for the information contents IN or their offering, the delivery of the key Sg3 can be recorded in order, during the next possible connection to the communication network K1, to perform a payment process for the use of the information contents IN.

For security reasons it is expedient for the information contents IN stored on the output unit AE to be deleted by the application AW—independently of whether said contents has been consumed or not—after the means of transportation BF has been used (e.g. after the end of the flight, etc.). Likewise all secret keys Sg1, Sg2, Sg3 should be deleted by the on-board server OB or by the key server EKS. This means that access to the encrypted information contents is no longer possible after the means of transportation has finished being used. It is also possible for example for the secret keys Sg1, Sg3 to already be deleted by the key server EKS after confirmation of transmission to the on-board server OB. If necessary the deletion of the information contents and also of the secret keys Sg1, Sg2, Sg3 can be carried out with a time delay in order to, for example, include delays to the means of transportation BF in the calculations.

As an alternative there is the option for the third key pair Sg3, Sp3 not to be generated on request of a selected information content IN and then to be assigned to the on-board server in the sixth method step 6, but for a number of third keys pairs Sg3, Sp3 to be generated in advance as a reserve and for this reserve to be assigned in advance to the on-board server OB and if necessary also transmitted. If now, in the fifth method step 5, a selected information content IN is requested by means of a unique identification by the application AW, then a third key pair Sg3, Sp3 is taken from the reserve and assigned to the unique identification. The advantage of this is that e.g. a selection of information contents IN can be made by a passenger just shortly before the beginning of use of the means of transportation BF (e.g. shortly before flight departure in the waiting area at the airport or in a lounge, etc.) and thus if necessary after a transmission of the third key Sg3 to the on-board server OB. Then, in the sixth method step 6, the third secret key Sg3 for the selected information content IN is then simply transmitted encrypted with the first public key Sp1 to the on-board server.

During the use of the means of transportation BF this third secret key Sg3 is then decrypted in the ninth method step with the first secret key Sg1 by the on-board server. The third secret key Sg3 can then be transmitted unencrypted to the application AW for example by means of a secure method. Thus Secure Socket Layer (SSL) can be used for a transmission for example. However the second public key Sp2 can also be used, which is sent unsecured to the on-board server OB for example. The third secret key Sg3 can then be encrypted e.g. with this key Sp2 and thus be transmitted to the output unit AE or the application AW which has the associated second secret key Sg2 available to it.

The option also exists of encrypting the selected information contents IN in the sixth method step 6 in a number of sections with different third key pairs Sg3, Sp3. To do this, in the fifth method step 5, the unique identification of the selected information content IN is assigned the for example number of third key pairs Sg3, Sp3, which are then included for the encryption of the respective sections. In this way consumption of the information contents IN after ending of the use of the means of transportation BF being able to be continued beyond the length of one section is prevented and at no time is there the option of completely decrypting the information content IN.

It can further also be envisaged in inventive methods that an automatic selection of information contents IN is made e.g. by the operator of the means of transportation BF before the use of the means of transportation BF and this is loaded onto the output unit AE. This can e.g. especially be favorite or frequently selected information contents IN or information contents IN which has a similarity to information contents IN already selected earlier by the passenger.

Through the inventive method and a system for carrying out the method, by a separation of the transfer of the encrypted information contents IN and the transfer of the keys Sg1, Sg2, Sg3, Sp1, Sp2, Sp3, an opportunity is provided for using strong and thus computing-time-intensive encryption algorithms which are not able to be used on on-board streaming systems because of memory and processing capacities. The encryption of the information contents IN is carried out individually per user or per passenger, wherein the user is known and thus if necessary theft of information contents would be able to be proved. Since the on-board server OB only makes available the keys Sg3 for decrypting the information contents IN, this can be designed to be very simple and low-cost. The logistical outlay for loading or updating information contents IN is also relatively low. The information contents IN are updated in the information database IDB and before each use of the means of transportation BF, or at least each day, the new keys Sg3 for decrypting the information contents IN selected by the passengers are loaded on the on-board server OB. This enables the passengers individually to be provided with a large and up-to-date offering of information contents IN, which additionally is protected from theft with very high security.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A method for assigning information contents which, when a means of transportation is used, are displayed and consumed on a user-specific output unit, comprising:
   assigning an on-board server to each means of transportation, via a first key pair, which includes a first secret key and a first public key, and the first secret key is stored on the on-board server;
   before the means of transportation is used, installing an application on the user-specific output unit;
   requesting, by the application, a second key pair with a second secret key and a second public key, and the second secret key is transmitted to the application, the second key uniquely assigned to a passenger on the means of transportation, the passenger associated with the user-specific output unit, wherein an identity of the passenger is known to an operator of the means of transportation;

displaying, by the application, available information contents that the passenger desires to consume during an impending use of the mean of transportation, and then a unique identification is created for each selected information content, wherein the passenger is assigned to the unique identification;

requesting, by the application by means of the unique identification, the selected information, and in this process the unique identification is assigned a third key pair with a third secret key and a third public key;

encrypting the third secret key with the first public key and the second public key, and is assigned to the on-board server of the means of transportation;

transmitting the selected information contents to the user-specific output unit outside the means of transportation, encrypted with the third public key; and establishing a connection between the on-board server and the user-specific output unit within the means of transportation, wherein the on-board server requests the third secret key necessary for decrypting the information contents selected for playback by the user-specific output unit, and decrypts the third secret key.

2. The method as claimed in claim 1, wherein, when the means of transportation is used, a connection is established from the user-specific output unit to the on-board server, that, before the on-board server plays back the selected information content, the third secret key is decrypted with the first secret key and is then transmitted to the application on the user-specific output unit, that then on the user-specific output unit the third secret key is decrypted with the second secret key, and that the selected information content is then decrypted by the application with the third secret key and displayed.

3. The method as claimed in claim 1, wherein an assignment between the on-board server, the user-specific output unit, the selected information contents and/or the first, second and third key pair is stored in an inventory database.

4. The method as claimed in one of claim 1, wherein, after installation of the application and a transmission of the second secret key to the application an information data record about a use of the means of transportation is transferred.

5. The method as claimed in claim 1, wherein the key pairs are created by a key server.

6. The method as claimed in claim 1, wherein the first and the second public keys of the first and second key pairs are stored in a key database.

7. The method as claimed in claim 1, wherein after exit from the means of transportation the secret keys as well as all selected information contents are deleted by the user-specific output unit.

8. The method as claimed in claim 1, wherein the unique identification is issued for each selected information content by a catalog server.

9. The method as claimed in claim 1, wherein the third key pair is created at the time that an information content is selected.

10. The method as claimed in claim 1, wherein a number of third key pairs are generated in advance and these third key pairs are transmitted to the on-board server.

11. The method as claimed claim 1, wherein the selected information contents are marked during an encryption.

12. The method as claimed in claim 1, wherein the means of transportation is an aircraft.

13. A system comprising:
an on-board server for setting up a connection with a user-specific output unit within a means of transportation;
an application, which is installed on the user-specific output unit;
a key server and a key database for creation and storage of a plurality of key pairs, each of the plurality of key pairs including a secret key and a public key;
a catalog server for requesting an offering of available information contents and for issuing unique identifications for selected information contents;
an encryption server for encryption of the selected information contents;
an inventory database for storage of assignments between the on-board server, the user-specific output unit, the selected information contents and/or respective associated key pairs of the plurality of key pairs;
an information database for storage of available and selectable information contents; and
at least one communication network in each case for respective communication outside and inside the means of transportation;
wherein the selected information is requested by the application by means of the unique identification, and in this process the unique identification is assigned a third key pair with a third secret key and a third public key;
wherein the third secret key is encrypted with the first public key and the second public key, and is assigned to the on-board server of the means of transportation;
wherein the on-board server requests the third secret key necessary for decrypting the information contents selected for playback by the user-specific output unit inside and decrypts the secret key necessary for decrypting the selected information contents inside the means of transportation.

14. The system as claimed in claim 13, wherein the key server, the catalog server and the encryption server are grouped on one server and/or key database, inventory database and information database are grouped in one database.

15. The system as claimed in claim 13, wherein the on-board server is a mobile unit.

16. The system as claimed in claim 13, wherein the on-board server a software module.

17. The system as claimed in claim 13, wherein the means of transportation is an aircraft.

* * * * *

UNITED STATES PATENT AND TRADEMARK OFFICE
CERTIFICATE OF CORRECTION

PATENT NO. : 9,682,778 B2
APPLICATION NO. : 14/423160
DATED : June 20, 2017
INVENTOR(S) : Gerald Schreiber It is certified that error appears in the above-identified patent and that said Letters Patent is hereby corrected as shown below:

In the Claims

Column 14, Line 7 (Claim 11, Line 1), please change "claimed claim" to -- claimed in claim --

Signed and Sealed this
Seventeenth Day of October, 2017

Joseph Matal
*Performing the Functions and Duties of the*
*Under Secretary of Commerce for Intellectual Property and*
*Director of the United States Patent and Trademark Office*